(12) United States Patent
Pan

(10) Patent No.: US 12,175,058 B2
(45) Date of Patent: Dec. 24, 2024

(54) ABILITY CASTING METHOD AND APPARATUS FOR VIRTUAL OBJECT, DEVICE, MEDIUM AND PROGRAM PRODUCT

(71) Applicant: Tencent Technology (Shenzhen) Company Limited, Shenzhen (CN)

(72) Inventor: Keyu Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/990,579

(22) Filed: Nov. 18, 2022

(65) Prior Publication Data

US 2023/0078592 A1 Mar. 16, 2023

Related U.S. Application Data

(63) Continuation of application No. PCT/CN2022/087836, filed on Apr. 20, 2022.

(30) Foreign Application Priority Data

May 20, 2021 (CN) .......................... 202110553091.1

(51) Int. Cl.
*G06F 3/0484* (2022.01)
*G06T 19/00* (2011.01)

(52) U.S. Cl.
CPC .......... *G06F 3/0484* (2013.01); *G06T 19/006* (2013.01)

(58) Field of Classification Search
CPC ............................. G06F 3/0484; G06T 19/006
See application file for complete search history.

(56) References Cited

U.S. PATENT DOCUMENTS 5,042,743 A * 8/1991 Carney ................. F41G 7/2293
                                                      244/3.11
9,919,205 B2 * 3/2018 Kim ........................ A63F 13/10
(Continued)

FOREIGN PATENT DOCUMENTS

CN 104133595 A 11/2014
CN 110448891 A 11/2019
(Continued)

OTHER PUBLICATIONS

SergiuHellDragoonHQ, "WarCraft3—Humans (4K Gameplay)" 2018, Youtube screen caps https://www.youtube.com/watch?v=4J6hYLxyETY 5 pages. (Year: 2018).*
Leilei Wang, "BMPT Locks Multiple Targets at the Same Time, a Missile Salvo, Too Against the Sky!" douyin.com, Mar. 23, 2020, 7 pgs., Retrieved from the Internet: https://www.douyin.com/video/6875541270144666894.
(Continued)

*Primary Examiner* — Haoshian Shih
(74) *Attorney, Agent, or Firm* — Morgan, Lewis & Bockius LLP

(57) ABSTRACT

A method for selecting a target performed by a computer device is disclosed. The method includes: displaying at least one second virtual object in a virtual environment picture; in response to a first operation, displaying a selection indicator on the virtual environment picture, the selection indicator being used for selecting n second virtual objects within a selection region corresponding to the location of the first selection operation on the virtual environment picture; and in response to a first confirmation operation, determining the n second virtual objects as a target. The method improves an aiming speed of simultaneously attacking a plurality of virtual objects by a plurality of virtual props.

16 Claims, 11 Drawing Sheets

(56) References Cited

U.S. PATENT DOCUMENTS

| | | | |
|---|---|---|---|
| 10,095,399 B2* | 10/2018 | Cha | G06F 3/0485 |
| 2004/0090548 A1* | 5/2004 | Obrador | H04N 23/632 |
| | | | 348/333.01 |
| 2005/0157223 A1* | 7/2005 | Sung | H04N 13/32 |
| | | | 348/E13.044 |
| 2009/0228842 A1* | 9/2009 | Westerman | G06V 30/1456 |
| | | | 715/863 |
| 2010/0273544 A1 | 10/2010 | Koganezawa et al. | |
| 2019/0255437 A1 | 8/2019 | Wang et al. | |

FOREIGN PATENT DOCUMENTS

| | | |
|---|---|---|
| CN | 111659118 A | 9/2020 |
| CN | 113117330 A | 7/2021 |
| JP | 2010017395 A | 1/2010 |

OTHER PUBLICATIONS

Tencent Technology, ISR, PCT/CN2022/087836, Jul. 21, 2022, 2 pgs.

Atwiki.Jp, "Basic Battle Controls", Azur Lane Crosswave (Azuren CW) Cheats, Dec. 2019, 14 pgs., Retrieved from the Internet: Jun. 10, 2024, https://w.atwiki.jp/azurlane-cw/pages/98.html.

GameWith.jp, How to Choose Azur Lane Equipment? Explain Basic Knowledge Related to Equipment! [Azurene], Aug. 2018, 44 pgs, Retrieved from the Internet: Jun. 10, 2024, https://gamewith.jp/azurlane/article/show/106866.

Unreal Engine.com, "Implementing a Multi-Lock-On System", Epic Developer Community Forum, Development Programming & Scripting / Blueprint, Feb. 2016, 7 pgs., Retrieved from the Internet: Jun. 10, 2024, https://forums.unrealengine.com/t/topic/346514.

* cited by examiner

ABILITY CASTING METHOD AND APPARATUS FOR VIRTUAL OBJECT, DEVICE, MEDIUM AND PROGRAM PRODUCT

CROSS-REFERENCE TO RELATED APPLICATIONS

This application is a continuation application of PCT Patent Application No. PCT/CN2022/087836, entitled "SKILL RELEASE METHODS, DEVICES, EQUIPMENT, MEDIA AND PROGRAM PRODUCTS FOR VIRTUAL OBJECTS" filed on Apr. 20, 2022, which claims priority to Chinese Patent Application No. 202110553091.1, filed with the State Intellectual Property Office of the People's Republic of China on May 20, 2021, and entitled "ABILITY CASTING METHOD AND APPARATUS FOR VIRTUAL OBJECT, DEVICE, MEDIUM AND PROGRAM PRODUCT", all of which are incorporated herein by reference in their entirety.

FIELD OF THE TECHNOLOGY

Embodiments of this application relate to the field of human-computer interaction, and in particular, to an ability casting method and apparatus for a virtual object, a device, a medium and a program product.

BACKGROUND OF THE DISCLOSURE

In a side-scrolling game, a user often needs to control a plurality of virtual props to simultaneously attack a plurality of virtual objects. In the related art, the user controls a virtual fighter to attack a plurality of virtual creatures. The virtual fighter simultaneously launches virtual missiles along a plurality of fixed directions, and the virtual creatures located in the fixed directions will be attacked by the virtual missiles.

In the related art, if the user wants to control the virtual fighter to attack a target virtual creature that is located out of the current fixed directions, the virtual fighter needs to be moved to make the target virtual creature be located in the changed fixed directions of the virtual fighter. There are complicated operation problems in the related art, leading to slow speed and low efficiency when the user controls the virtual fighter to aim at the target virtual creature.

SUMMARY

This application provides an ability casting method and apparatus for a virtual object, a device, a medium and a program product, which improves the human-computer interaction efficiency of a user. A technical solution is as follows:

According to an aspect of this application, a method for selecting a target is performed by a computer device, the method including:
  displaying at least one second virtual object in a virtual environment picture;
  in response to a first operation, displaying a selection indicator on the virtual environment picture, the selection indicator being used for selecting n second virtual objects within a selection region corresponding to the location of the first selection operation on the virtual environment picture; and
  in response to a first confirmation operation, determining the n second virtual objects as a target.

According to another aspect of this application, an apparatus for selecting a target is provided, including:
  a display module, configured to display at least one second virtual object in a virtual environment picture;
  the display module being further configured to display, in response to a first operation, a selection indicator on the virtual environment picture, the selection indicator being used for selecting n second virtual objects within a selection region corresponding to the location of the first selection operation on the virtual environment picture; and
  a control module, configured to determine, in response to a first confirmation operation, the n second virtual objects as a target.

According to an aspect of this application, a computer device is provided, including: a processor and a memory, the memory storing a computer program, and the computer program being loaded and executed by the processor and causing the computer device to implement the foregoing method for selecting a target.

According to another aspect of this application, a non-transitory computer-readable storage medium is provided, storing a computer program, the computer program being loaded and executed by a processor of a computer device and causing the computer device to implement the foregoing method for selecting a target.

According to another aspect of this application, a computer program product is provided, including computer instructions, the computer instructions being stored in a non-transitory computer-readable storage medium. A processor of a computer device reads the computer instructions from the computer-readable storage medium, and executes the computer instructions, so that the computer device performs the ability casting method for a virtual object provided in the foregoing aspects.

The technical solutions provided in the embodiments of this application include at least the following beneficial effects:
  the lock indicator of the first ability is set on a side-scrolling virtual environment picture to lock the second virtual object located in a range of the lock indicator, and then the m virtual flying objects simultaneously released by the first virtual object are controlled to automatically track the n second virtual objects in the range of the lock indicator. The foregoing method improves an aiming speed of simultaneously attacking a plurality of virtual objects by a plurality of virtual props, which greatly reduces operation difficulty for a player and improves the human-computer interaction efficiency of the user.

DESCRIPTION OF EMBODIMENTS

Figure 1:
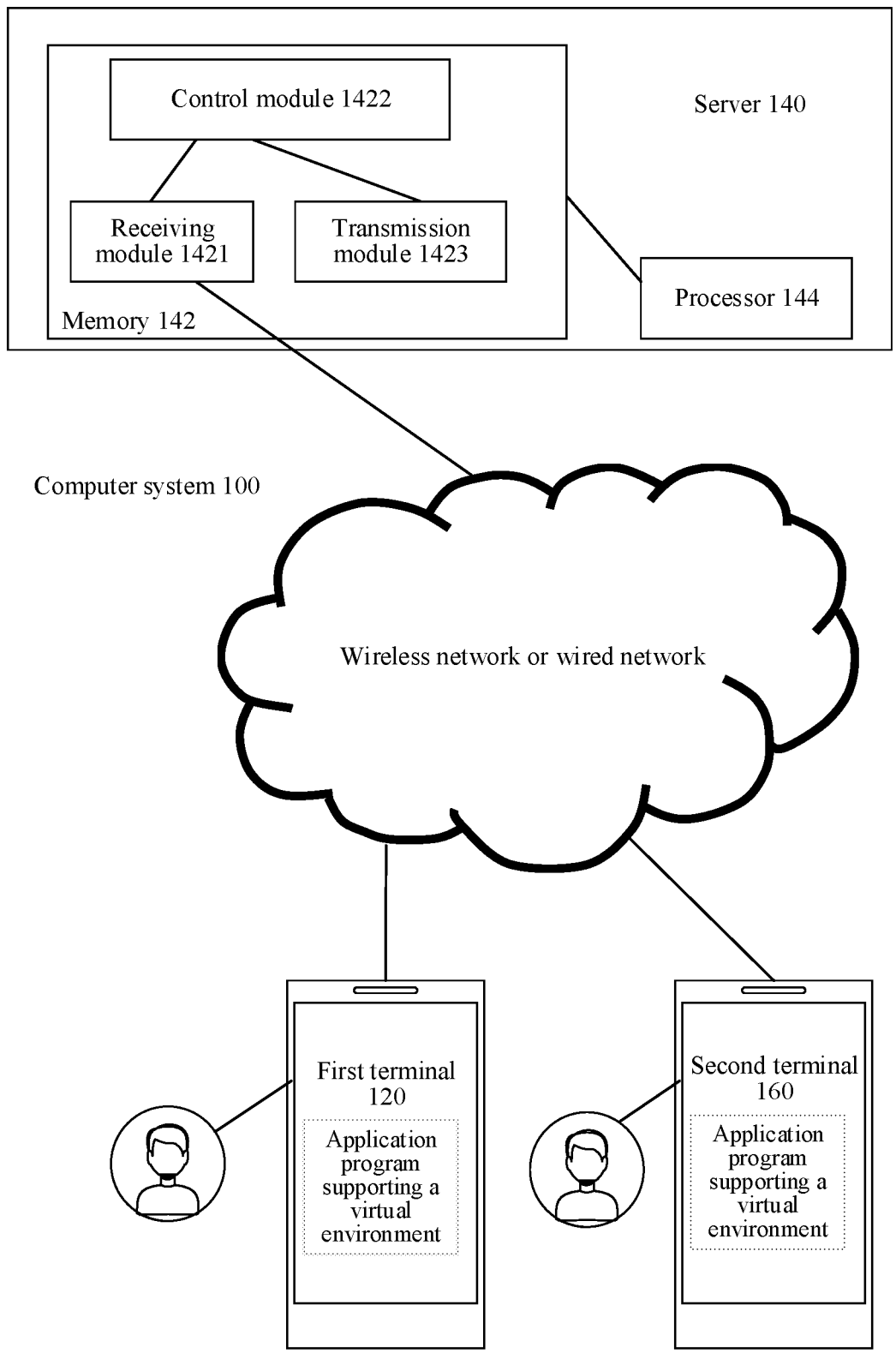
FIG. 1 is a structural block diagram of a computer system according to an exemplary embodiment.

First, terms involved in the embodiments of this application are briefly introduced.

Lock indicator: A lock indicator is used for locking a virtual object in a cast region of a first ability.

Locking refers to performing real-time detection and real-time positioning on the virtual object in the cast region of the first ability. Through real-time positioning, it is ensured that finally m virtual flying objects released by a first virtual object can reduce attribute values of n second virtual objects in a manner of automatically tracking.

In some embodiments, the lock indicator is represented as being geometric, such as being circular, being sector-shaped or a being rectangular. In some embodiments, the lock indicator is displayed on a side-scrolling virtual environment picture in an invisible manner, that is, the lock indicator is invisible to the naked eye; or in an embodiment, the lock indicator is displayed on the side-scrolling virtual environment picture in a visible manner, that is, a user can directly see the lock indicator. In an exemplary embodiment, the lock indicator may lock a static virtual object in the cast region of the first ability, that is, the lock indicator performs detection and positioning on the static virtual object and reduces an attribute value of the locked static virtual object in the manner of automatically tracking. In an exemplary embodiment, the lock indicator may lock a dynamic virtual object in the cast region of the first ability, that is, the lock indicator performs real-time detection and real-time positioning on the dynamic virtual object and reduces an attribute value of the dynamic virtual object in the manner of automatically tracking.

In an embodiment, there is an included angle between the lock indicator and a side-scrolling perspective of a virtual environment. In some embodiments, the included angle between the lock indicator and the side-scrolling perspective of the virtual environment is a right angle, that is, a display plane of the lock indicator is perpendicular to a perspective direction; or in an embodiment, the included angle between the lock indicator and the side-scrolling perspective of the virtual environment is an acute angle. In some embodiments, when the lock indicator is represented as a circular region on the side-scrolling virtual environment picture, the circular region is perpendicular to a side-scrolling perspective direction of the virtual environment; or in an embodiment, when the lock indicator is represented as the circular region on the side-scrolling virtual environment picture, the included angle between the circular region and the side-scrolling perspective of the virtual environment is an acute angle.

Attribute value of a virtual object: An attribute value of a virtual object is, such as, a hit point, an energy value of casting an ability, a defense point, an attack point, or a movement speed.

Side-scrolling game: A side-scrolling game refers to a game in which a movement route of a game character is controlled in a horizontal picture. In all pictures or most pictures in the side-scrolling game, the movement route of the game character is along a horizontal direction. According to contents, the side-scrolling game may be divided into a side-scrolling clearance game, a side-scrolling adventure game, a side-scrolling competition game, a side-scrolling strategy game, and the like; and according to technologies, the side-scrolling game may be divided into a two-dimensional (2D) side-scrolling game and a three-dimensional (3D) side-scrolling game.

Virtual environment: A virtual environment is a virtual environment displayed (or provided) when an application runs on a terminal. The virtual environment may be a simulated environment of a real world, or may be a semi-simulated and semi-fictional environment, or may be a completely fictional environment. The virtual environment may be any one of a two-dimensional virtual environment, a 2.5-dimensional virtual environment, and a three-dimensional virtual environment, which is not limited in this application. A description is made by using an example in which the virtual environment is a three-dimensional virtual environment in the following embodiments.

In some embodiments, the virtual environment may provide a battle environment of a virtual object. Exemplarily, in a side-scrolling game, one or two virtual objects play in a single-round battle in the virtual environment. The virtual object escapes attacks by an enemy unit and dangers (such as a poison gas area and a swamp) in the virtual environment to survive in the virtual environment. When a hit point of the virtual object in the virtual environment is zero, the life of the virtual object in the virtual environment ends, and the final virtual object successfully passing the routes in levels wins. Each client may control one or more virtual objects in the virtual environment. In some embodiments, arena modes of the battle may include a single-player battle mode, a two-player team battle mode, or a multi-player team battle mode. The battle mode is not limited in the embodiments.

Exemplarily, a side-scrolling virtual environment picture is a picture in which the virtual environment is observed in a horizontal screen perspective of a virtual character, for example, a shooting game in which the virtual environment is observed in a direction perpendicular to a right side of the virtual character.

Virtual object: A virtual object refers to a movable object in the virtual environment. The movable object may be a virtual character, a virtual animal, or a cartoon character, for example, a character or an animal displayed in the three-dimensional virtual environment. In some embodiments, the virtual object is a three-dimensional model created based on a skeletal animation technology. Each virtual object has a shape and size in the three-dimensional virtual environment, and occupies some space in the three-dimensional virtual environment.

In some embodiments, the virtual object may be divided into different character types based on attribute values or possessed abilities. For example, a target virtual object has a remote output type ability, and a corresponding character type may be a shooter; and if the target virtual object has an auxiliary type ability, the corresponding character type may be an auxiliary. In some embodiments, the same virtual object may correspond to a plurality of character types.

Side-scrolling game: A side-scrolling game refers to a game in which a movement route of a game character is controlled in a horizontal picture. In all pictures or most pictures in the side-scrolling game, the movement route of the game character is along a horizontal direction. According to contents, the side-scrolling game may be divided into a side-scrolling clearance game, a side-scrolling adventure game, a side-scrolling competition game, a side-scrolling strategy game, and the like; and according to technologies, the side-scrolling game may be divided into a two-dimensional (2D) side-scrolling game and a three-dimensional (3D) side-scrolling game.

Virtual prop: A virtual prop refers to a prop that can be used by a virtual object in a virtual environment, including a supply prop that can change an attribute value of another virtual object, such as a bullet or a virtual weapon, a defensive prop such as a shield, an armor, or an armored vehicle, a virtual prop such as a virtual beam or a virtual shock wave shown through a hand when being used for casting an ability by the virtual object, a body part of the virtual object, such as a hand or a leg, and a virtual prop that can change the attribute value of another virtual object, including a long-distance virtual prop such as a pistol, a rifle, or a sniper rifle, a short-distance virtual prop such as a dagger, a knife, a sword, or a rope, and a throwing type virtual prop such as a flying axe, a flying knife, a grenade, a flash bomb, or a smoke bomb. In this application, a virtual flying object belongs to a special prop in the virtual props. The virtual flying object may be a virtual prop having a flying attribute, or may be a virtual prop thrown by a virtual object, or further may be a virtual prop launched by a virtual object during shooting.

Information (including, but not limited to, user device information, user personal information, and the like), data (including, but not limited to, analyzed data, stored data, presented data, and the like), and a signal involved in this application are all authorized by the user or fully authorized by each side, and the collection, use and processing of relevant data are required to comply with a relevant law, regulation and standard of a relevant country and region.

FIG. 1 is a structural block diagram of a computer system according to an exemplary embodiment of this application. The computer system 100 includes: a first terminal 120, a server 140, and a second terminal 160.

An application program supporting a virtual environment is installed and run on the first terminal 120. The application program may be any one of a three-dimensional map application, side-scrolling shooting, side-scrolling adventure, side-scrolling clearance, side-scrolling strategy, a virtual reality (VR) application program, and an augmented reality (AR) program. The first terminal 120 is a terminal used by a first user, and the first user uses the first terminal 120 to control a first virtual object in the virtual environment to perform a movement. The movement includes, but is not limited to: at least one of body posture adjustment, walking, running, jumping, cycling, driving, aiming, picking-up, using a throwing type prop, and attacking another virtual object. Exemplarily, the first virtual object is a first virtual character, such as a simulated character object or a cartoon character object. Exemplarily, the first user controls the first virtual object to perform the movement through a UI control on a virtual environment picture.

The first terminal 120 is connected to the server 140 by using a wireless network or a wired network.

The server 140 includes at least one of one server, a plurality of servers, a cloud computing platform, and a virtualization center. Exemplarily, the server 140 includes a processor 144 and a memory 142. The memory 142 includes a receiving module 1421, a control module 1422, and a transmission module 1423. The receiving module 1421 is configured to receive a request, for example, a team-up request, transmitted by a client; the control module 1422 is configured to control rendering of the virtual environment picture; and the transmission module 1423 is configured to transmit a response to the client, for example, to transmit prompt information of a team-up success to the client. The server 140 is configured to provide a backend service for an application program supporting a three-dimensional virtual environment. In some embodiments, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

An application program supporting a virtual environment is installed and run on the second terminal 160. The application program may be any one of a three-dimensional map application, side-scrolling shooting, side-scrolling adventure, side-scrolling clearance, side-scrolling strategy, a virtual reality application program, and an augmented reality program. The second terminal 160 is a terminal used by a second user, and the second user uses the second terminal 160 to control a second virtual object in the virtual environment to perform a movement. The movement includes, but is not limited to: at least one of body posture adjustment, walking, running, jumping, cycling, driving, aiming, picking-up, using a throwing type prop, and attacking another virtual object. Exemplarily, the second virtual object is a second virtual character, such as a simulated character object or a cartoon character object.

In some embodiments, the first virtual object and the second virtual object are located in the same virtual environment. In some embodiments, the first virtual object and the second virtual object may belong to the same team, the same organization, or the same camp, have a friend relationship with each other, or have a temporary communication permission. In some embodiments, the first virtual object and the second virtual object may belong to different camps, different teams, or different organizations, or have a hostile relationship with each other.

In some embodiments, the applications installed on the first terminal 120 and the second terminal 160 are the same, or the applications installed on the two terminals are the same type of applications on different operating system platforms (Android system or iOS system). The first terminal 120 may be generally one of a plurality of terminals, and the second terminal 160 may be generally one of a plurality of terminals. In this embodiment, only the first terminal 120 and the second terminal 160 are used for description. The device types of the first terminal 120 and the second terminal 160 are the same or different. The device types include: at least one of a smartphone, a tablet computer, an e-book reader, an MP3 player, an MP4 player, a laptop portable computer and a desktop computer. The following embodiment is described by using an example in which the terminal includes a smartphone.

A person skilled in the art may learn that there may be more or fewer terminals. For example, there may be only one terminal, or there may be dozens of or hundreds of terminals or more. The quantity and the device type of the terminals are not limited in this embodiment of this application.

Figure 2:
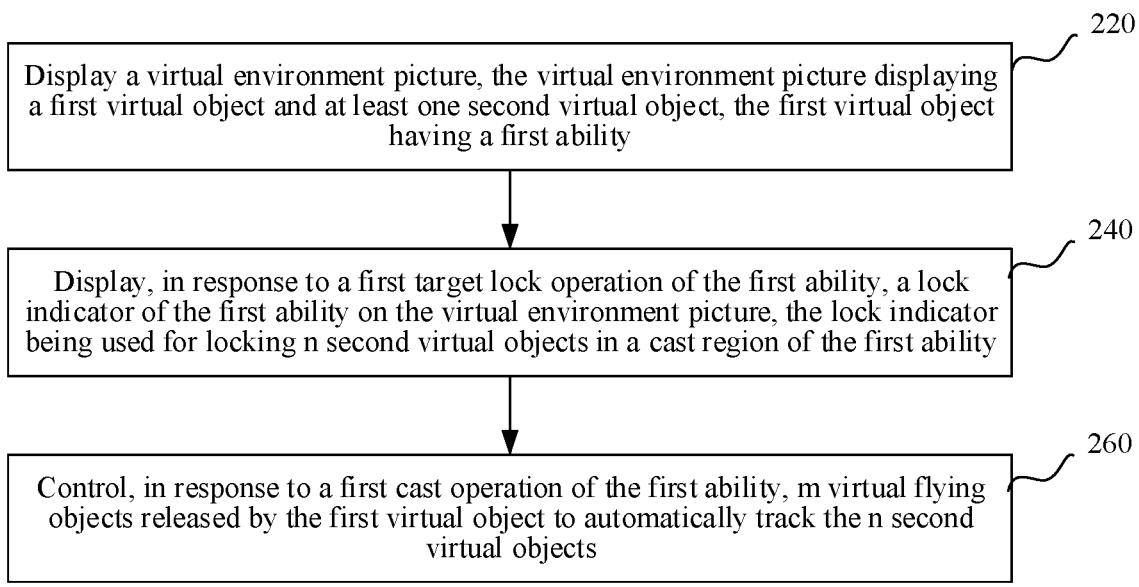
FIG. 2 is a flowchart of a method for a virtual object to cast an ability according to an exemplary embodiment.

FIG. 2 is a flowchart of a method for a virtual object to cast an ability according to an exemplary embodiment of this application. This embodiment is described by using an example in which the method is performed by the first terminal 120 (or the client in the first terminal 120) shown in FIG. 1. The method includes the following steps:

Step 220: Display a virtual environment picture, the virtual environment picture displaying a first virtual object and at least one second virtual object, the first virtual object having a first ability.

The virtual environment picture may be at least one of a side-scrolling virtual environment picture, a vertical-version virtual environment picture, a three-dimensional virtual environment picture, and a two-dimensional virtual environment picture.

The first virtual object refers to a movable object in a virtual environment. The movable object may be a virtual character, a virtual animal, a cartoon character, or the like. The second virtual object refers to another movable object in the virtual environment. In some embodiments, the first virtual object and the second virtual object are located in the same virtual environment. In some embodiments, the first virtual object and the second virtual object may belong to the same team, the same organization, or the same camp, have a friend relationship with each other, or have a temporary communication permission. In some embodiments, the first virtual object and the second virtual object may belong to different camps, different teams, or different organizations, or have a hostile relationship with each other. This application is described by using an example in which the first virtual object and the second virtual object have a hostile relationship with each other. In this application, the first virtual object casts the first ability leading to a decrease of the attribute value of the second virtual object.

The first ability refers to a release ability of the first virtual object in the virtual environment. In some embodiments, the first ability refers to an ability of the first virtual object to cast an ability; in an embodiment, the first ability refers to an ability of the first virtual object to release a virtual prop; in an embodiment, the first ability refers to an ability of the first virtual object to release a virtual flying object through the virtual prop; or in an embodiment, the first ability refers to an ability of the first virtual object to release the virtual flying object through the ability.

In an embodiment, the first ability refers to the ability of the first virtual object to release the virtual flying object through the ability. In some embodiments, the ability is a basic ability of the first virtual object, where the basic ability is an ability (for example, a preset ability such as normal attacking) that the first virtual object can master without learning; and in an embodiment, the ability is a learning type ability of the first virtual object, where the learning type ability is an ability that the first virtual object can only master after learning or picking up. An obtaining manner of the ability is not limited in this application. Exemplarily, the first virtual object releases m virtual flying objects through casting the ability.

In an embodiment, the first ability refers to the ability of the first virtual object to release the virtual flying object through the virtual prop. For example, the first virtual object tears up a virtual scroll to release m virtual flying objects.

In some embodiments, the first virtual object releases the m virtual flying objects at one time; or in an embodiment, the first virtual object releases the virtual flying objects in batches, and the number of the virtual flying objects released in each batch is at least two.

In an embodiment, the first ability of the first virtual object is displayed as reducing the attribute value of the second virtual object in a manner of automatically tracking by the m virtual flying objects simultaneously released by the first virtual object.

The side-scrolling virtual environment picture is obtained by capturing a field of view obtained by the first virtual object based on a side-scrolling perspective in the virtual environment and displaying the field of view on a terminal. The virtual environment is a virtual environment displayed (or provided) when an application program runs on the terminal. The virtual environment may be a simulated environment of a real world, or may be a semi-simulated and semi-fictional environment, or may be a completely fictional environment.

Figure 3:
FIG. 3 is a schematic diagram of a side-scrolling virtual environment picture according to an exemplary embodiment.

In an embodiment, FIG. 3 shows a side-scrolling virtual environment picture according to an exemplary embodiment of this application. Schematically, the side-scrolling virtual environment picture includes a first virtual object 301 and a second virtual object 302 in at least one second virtual object. The first virtual object 301 in the FIG. 3 moves along a horizontal direction until entering a level in the side-scrolling virtual environment picture shown in FIG. 3.

Step 240: Display, in response to a first target lock operation of the first ability, a lock indicator of the first ability on the virtual environment picture, the lock indicator being used for locking n second virtual objects within a cast region of the first ability.

In an embodiment, there is an included angle between the lock indicator and a side-scrolling perspective of a virtual environment. In some embodiments, the included angle between the lock indicator and the side-scrolling perspective of the virtual environment is a right angle, that is, a display plane of the lock indicator is perpendicular to a perspective direction; or in an embodiment, the included angle between the lock indicator and the side-scrolling perspective of the virtual environment is an acute angle. In some embodiments, when the lock indicator is represented as a circular region on the side-scrolling virtual environment picture, the circular region is perpendicular to a side-scrolling perspective direction of the virtual environment; or in an embodiment, when the lock indicator is represented as the circular region on the side-scrolling virtual environment picture, the included angle between the circular region and the side-scrolling perspective of the virtual environment is an acute angle.

The first target lock operation is used for locking the n second virtual objects in the cast region of the first ability. In some embodiments, the first target lock operation is a touch start operation of the user on the side-scrolling virtual environment picture, a terminal determines a first positioning point of the lock indicator of the first ability on the side-scrolling virtual environment picture, and the lock indicator is generated based on the first positioning point of the lock indicator; or in an embodiment, the first target lock operation is a lock operation of the user on a peripheral component connected to the terminal, exemplarily, the user determines the first positioning point of the lock indicator of the first ability on the side-scrolling virtual environment picture through a peripheral gamepad connected to the terminal, and the lock indicator is generated based on the first positioning point of the lock indicator.

The cast region or selection region of the first ability refers to a function region of the first ability on the virtual environment picture. In some embodiments, the cast region of the first ability is displayed as a closed geometric figure, and the closed geometric figure surrounds the n second virtual objects; and in an embodiment, the cast region of the first ability is displayed as multiple closed geometric figures, and each closed geometric figure surrounds multiple second virtual objects in the n second virtual objects.

Figure 4:
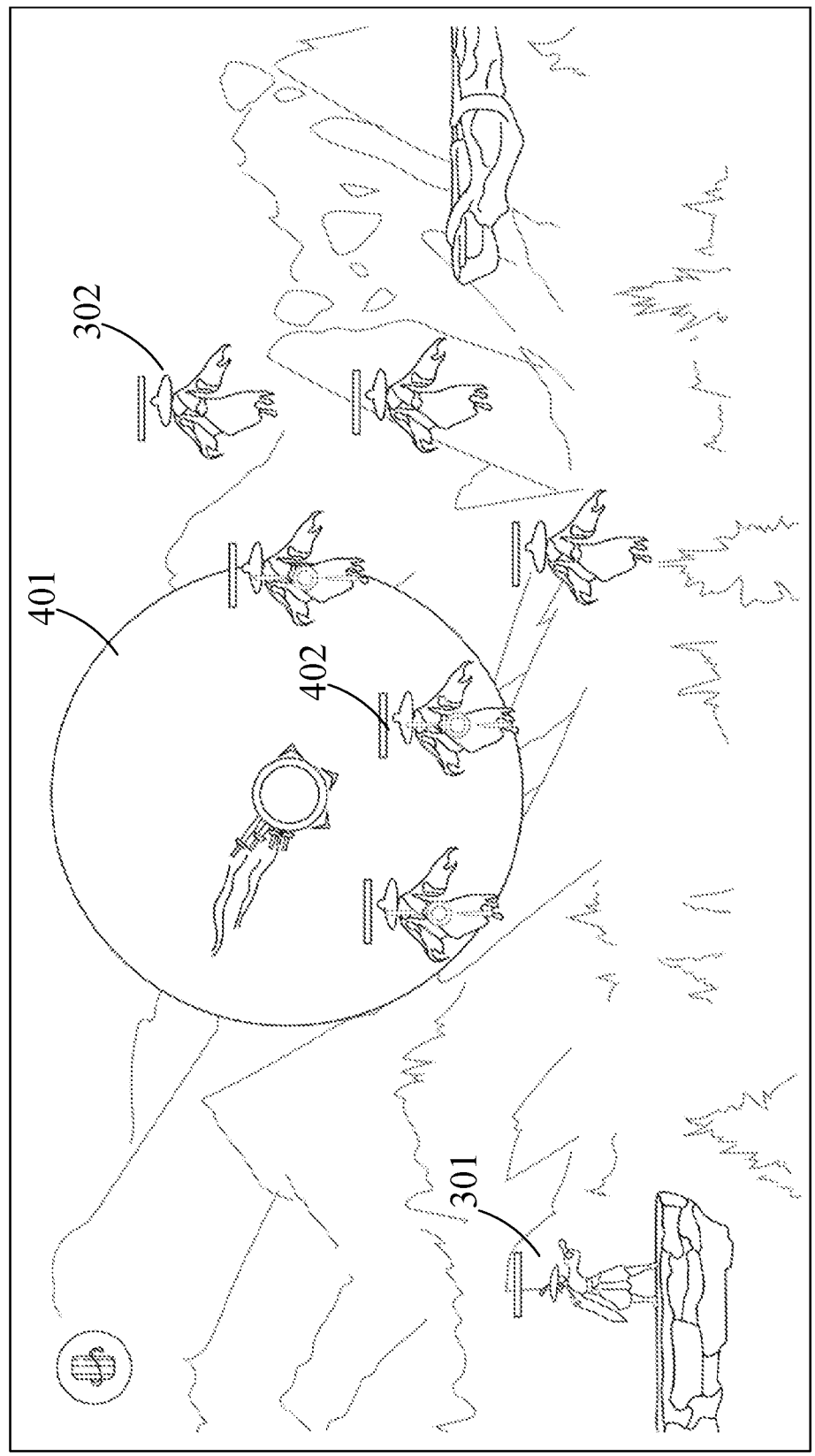
FIG. 4 is a schematic diagram of a side-scrolling virtual environment picture according to another exemplary embodiment.

Schematically, with reference to FIG. 4, FIG. 4 is a schematic diagram of a side-scrolling virtual environment picture according to an exemplary embodiment of this application. The side-scrolling virtual environment picture includes a first virtual object 301 and a second virtual object 302 in at least one second virtual object. A lock indicator 401 in FIG. 4 includes 3 locked second virtual objects 402 within a cast or selection region corresponding to the location of the first selection operation on the virtual environment picture (e.g., the first target lock operation), where the locked second virtual objects 402 exhibit locked performance features, and centers of bones of the locked second virtual objects 402 present circles. The second virtual object may be a three-dimensional model created based on a skeletal animation technology. Each second virtual object has a shape and size in the three-dimensional virtual environment, and occupies some space in the three-dimensional virtual environment. In some embodiments, when the first selection operation moves on the virtual environment picture, the cast or selection region is updated accordingly such that a second virtual object 402 that was already within the cast or selection region may be moved out of the lock indicator 401 but another second virtual object 302 that was not within the cast or selection region may fall into the lock indicator 401 due to the movement of the first selection operation.

In some embodiments, when the virtual environment picture is a three-dimensional virtual environment picture, the three-dimensional virtual environment picture is captured from a three-dimensional virtual environment through a camera model, and there is an included angle between a plane on which the cast region of the first ability is located and a plane on which the three-dimensional virtual environment picture is located. The cast region of the first ability in the three-dimensional virtual environment picture is determined according to a region of the lock indicator of the first ability on the three-dimensional virtual environment picture.

Step 260: Control, in response to a first cast operation of the first ability, m virtual flying objects released by the first virtual object to automatically track the n second virtual objects.

m and n are both integers not less than 2.

In some embodiments, the m virtual flying objects adjust attribute values of then second virtual objects, and an adjustment method includes a decrease of the attribute values and an increase of the attribute values. The attribute value includes but is not limited to at least one of a hit point of the second virtual object, an energy value of casting an ability, a defense point, an attack point, or a movement speed. Exemplarily, in response to the first cast operation of the first ability, the m virtual flying objects simultaneously released by the first virtual object are controlled to reduce attribute values of the n second virtual objects in a manner of automatically tracking; or, in response to the first cast operation of the first ability, the m virtual flying objects simultaneously released by the first virtual object are controlled to increase attribute values of the n second virtual objects in a manner of automatically tracking.

In some embodiments, the m virtual flying objects are released by the first virtual object simultaneously; or, the m virtual flying objects are released by the first virtual object in sequence. Exemplarily, the m virtual flying objects refer to m virtual flying swords, and the first virtual object releases one virtual flying sword every 0.3 seconds.

The virtual flying objects refer to the virtual props in the first ability cast by the virtual object in the virtual environment, including supply props such as bullets that can change the attribute value of the second virtual object, virtual flying shields, virtual beams, virtual shock waves, or the like. Exemplarily, the virtual flying objects are virtual props shown through a hand when being used for casting an ability by the first virtual object, or virtual props such as virtual flying daggers, virtual flying knives, virtual flying swords, or virtual flying axes, or throwing type virtual props such as grenades, flash bombs, or smoke bombs.

In some embodiments, the m virtual flying objects are displayed with the same performance features, for example, the m virtual flying objects are displayed as m same virtual flying swords; in an embodiment, the m virtual flying objects are displayed with totally different performance features, for example, the m virtual flying objects are displayed as m different virtual flying swords; or in an embodiment, the m virtual flying objects are displayed with partially same performance features, for example, the m virtual flying objects are displayed as m/2 first virtual flying swords and m/2 second virtual flying swords.

In some embodiments, the m virtual flying objects have an ability to automatically track the n second virtual objects, that is, after in response to the releasing of the m virtual flying objects by the first virtual object, the user does not need to control the m virtual flying objects again and the m virtual flying objects automatically track the n second virtual objects.

In an embodiment, the controlling, in response to a first cast operation of the first ability, m virtual flying objects released by the first virtual object to automatically track then second virtual objects at least includes the following two methods.

First, when m is not less than n, the m virtual flying objects simultaneously released by the first virtual object are controlled to automatically track one second virtual object in the n second virtual objects respectively, where
each second virtual object in the n second virtual objects at least corresponds to one virtual flying object in the m virtual flying objects.

In an exemplary embodiment, when m is not less than n, i is not greater than n, and i is greater than 0, an $i^{th}$ virtual flying object in the m virtual flying objects is controlled to automatically track an $i^{th}$ virtual object in the n second virtual objects; and when m is not less than n, i is greater than n, and i is not greater than m, an $(i+1)^{th}$ virtual flying object in the m virtual flying objects is controlled to automatically track an $(i-n)^{th}$ virtual object in the n second virtual objects.

When the m virtual flying objects adjust the attribute values of then second virtual objects, and in an embodiment, when m is not less than n, the m virtual flying objects simultaneously released by the first virtual object are controlled to reduce the attribute value of one second virtual object in then second virtual objects respectively in a manner of automatically tracking.

In an exemplary embodiment, when m is not less than n, i is not greater than n, and i is greater than 0, the $i^{th}$ virtual flying object in the m virtual flying objects is controlled to reduce the attribute value of the $i^{th}$ virtual object in the n second virtual objects in the manner of automatically tracking; and when m is not less than n, i is greater than n, and i is not greater than m, the $(i+1)^{th}$ virtual flying object in the m virtual flying objects is controlled to reduce the attribute value of the $(i-n)^{th}$ virtual object in the n second virtual objects in the manner of automatically tracking.

That is, first, the m virtual flying objects traverse n second virtual objects until the last virtual object is traversed. After that, an $(n+1)^{th}$ virtual flying object start traversing from the beginning until the traversing of the m virtual flying objects is completed. In the current embodiment, each second virtual object in the n second virtual objects at least corresponds to one virtual flying object in the m virtual flying objects.

Second, when m is less than n, the m virtual flying objects released by the first virtual object are controlled to automatically track m second virtual objects in then second virtual objects, where the m second virtual objects are in a one-to-one correspondence to the m virtual flying objects.

That is, the m virtual flying objects are sequentially allocated to the m second virtual objects in the n virtual objects until the allocation of the m virtual flying objects is completed. In the current embodiment, the m second virtual objects are in a one-to-one correspondence to the m virtual flying objects.

When the m virtual flying objects adjust the attribute values of then second virtual objects, exemplarily, when m is not less than n, the m virtual flying objects simultaneously released by the first virtual object are controlled to reduce the attribute values of them second virtual objects in then second virtual objects in a manner of automatically tracking.

Figure 5:
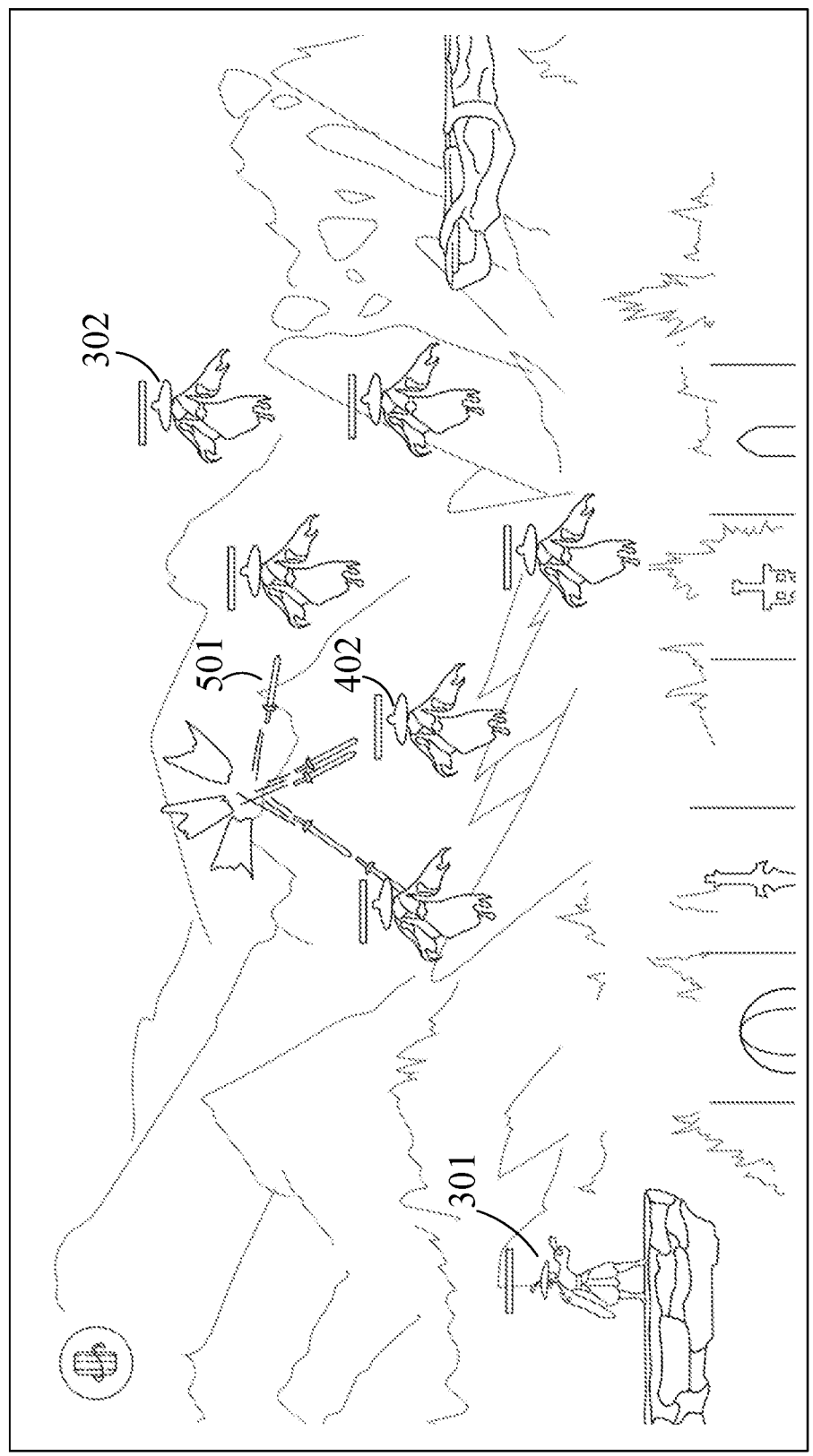
FIG. 5 is a schematic diagram of a side-scrolling virtual environment picture according to another exemplary embodiment.

Exemplarily, FIG. 5 is a schematic diagram of a side-scrolling virtual environment picture according to an exemplary embodiment of this application. FIG. 5 shows that 5 virtual flying objects reduce the attribute values of 3 second virtual flying objects in a manner of automatically tracking. The side-scrolling virtual environment picture in FIG. 5 includes a first virtual object 301 and a second virtual object 302 in at least one second virtual object. The 5 virtual flying objects 501 reduce the attribute values of the 3 locked second virtual objects 402 in a manner of automatically tracking, and an allocation manner is as shown in FIG. 5. From left to right, 2 virtual flying objects 501 are allocated to a first locked second virtual object 402, 2 virtual flying objects 501 are allocated to a second locked second virtual object 402, and 1 virtual flying object 501 is allocated to a third locked second virtual object 402.

In conclusion, the lock indicator of the first ability is set on a side-scrolling virtual environment picture to lock the second virtual object located in a range of the lock indicator, and then the m virtual flying objects simultaneously released by the first virtual object are controlled to reduce the attribute values of the n second virtual objects in the range of the lock indicator in a manner of automatically tracking. When m is not less than n, each second virtual object in the n second virtual objects at least corresponds to one virtual flying object in the m virtual flying objects; and when m is less than n, m second virtual objects in the n second virtual objects are in a one-to-one correspondence to the m virtual flying objects.

The foregoing method improves an aiming speed of simultaneously attacking a plurality of virtual objects by a plurality of virtual props, which greatly reduces operation difficulty for a player and improves the human-computer interaction efficiency of the user.

To implement performing target locking and ability casting on a single second virtual object, based on the embodiment shown in FIG. 2 which further includes step 270 and step 280, this embodiment is described by using an example in which the method is performed by the first terminal 120 (or the client in the first terminal 120) shown in FIG. 1.

Step 270: Lock, in response to a second target lock operation of the first ability, a target virtual object in the at least one second virtual object on the virtual environment picture.

The second target lock operation is used for locking one second virtual object in the cast region of the first ability by the first ability. In some embodiments, the second target lock operation is a touch operation of the user on the side-scrolling virtual environment picture, a terminal determines a second positioning point of the first ability on the side-scrolling virtual environment picture, and the terminal determines an action object, that is, a target virtual object, of the first ability based on the second positioning point; or in an embodiment, the second target lock operation is a lock operation of the user on a peripheral component connected to the terminal, exemplarily, the user determines the second positioning point on the side-scrolling virtual environment picture through a peripheral gamepad connected to the terminal, and the terminal determines the action object, that is, the target virtual object, of the first ability based on the second positioning point.

The target virtual object is a virtual object selected from the at least one second virtual object on the side-scrolling virtual environment picture by the user, and the target virtual object is an action object of the first ability cast by the user.

In an embodiment, in response to detecting a touch start operation on the side-scrolling virtual environment picture, a second positioning point of the first ability is determined, where the second positioning point is used for locking the target virtual object in the at least one second virtual object on the side-scrolling virtual environment picture.

Step 280: Control, in response to a second cast operation of the first ability, the m virtual flying objects simultaneously released by the first virtual object to automatically track the target virtual object.

The second cast operation refers to an operation used for casting the first ability.

The attribute value includes but is not limited to at least one of a hit point of the second virtual object, an energy value of casting an ability, a defense point, an attack point, or a movement speed.

When the m virtual flying objects adjust the attribute values of then second virtual objects, exemplarily, in response to the second cast operation of the first ability, the m virtual flying objects simultaneously released by the first virtual object are controlled to reduce the attribute value of the target virtual object in a manner of automatically tracking.

In an embodiment, in response to detecting a touch terminate operation on the side-scrolling virtual environment picture, the m virtual flying objects simultaneously released by the first virtual object are controlled to reduce the attribute value of the target virtual object in a manner of automatically tracking.

Figure 6:
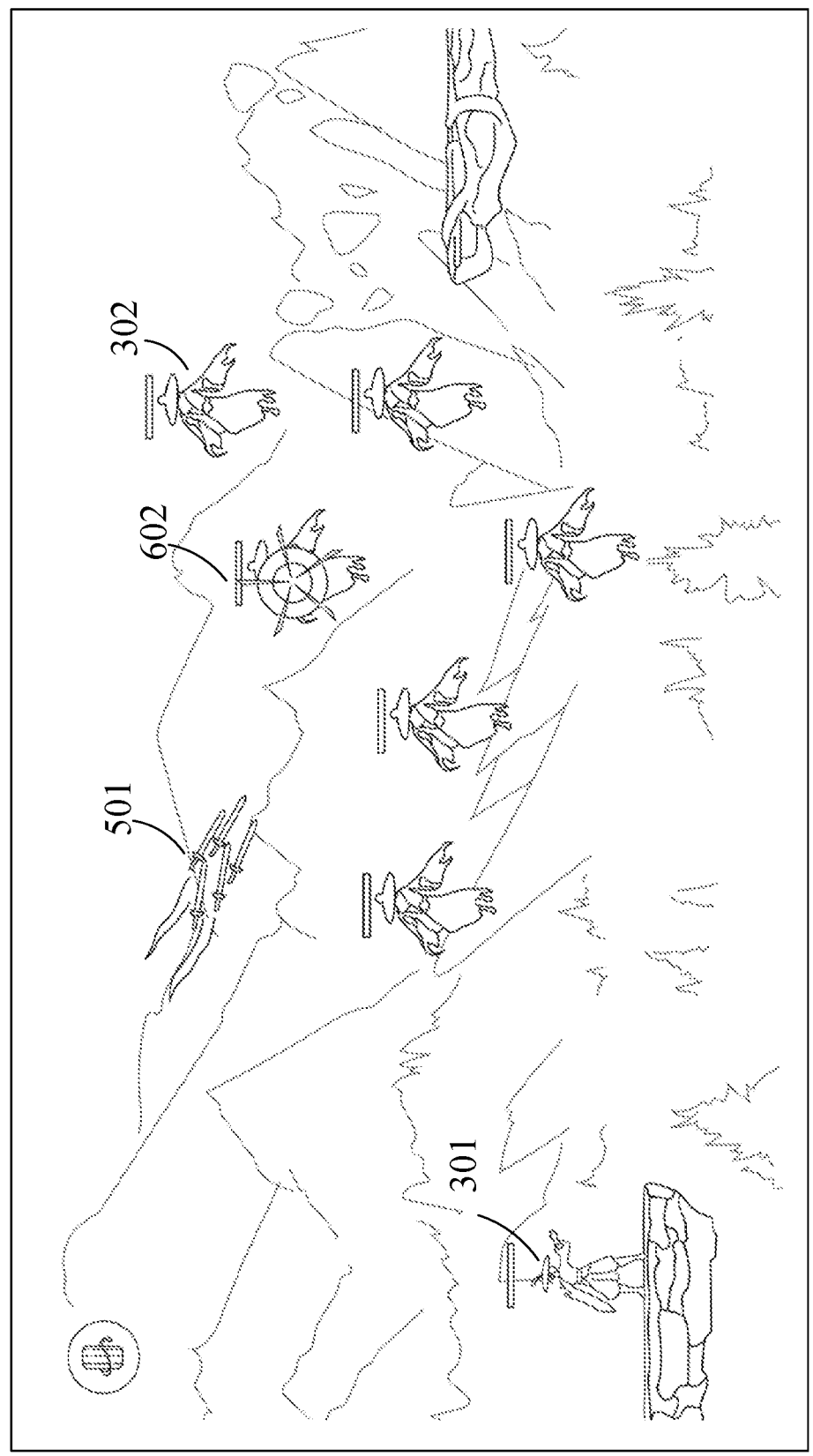
FIG. 6 is a schematic diagram of a side-scrolling virtual environment picture according to another exemplary embodiment.

Schematically, FIG. 6 is a schematic diagram of a side-scrolling virtual environment picture according to an exemplary embodiment of this application. FIG. 6 shows that 5 virtual flying objects reduce the attribute value of the target virtual object in a manner of automatically tracking. The side-scrolling virtual environment picture in FIG. 6 includes a first virtual object 301 and a second virtual object 302 in at least one second virtual object. The 5 virtual flying objects 501 reduce the attribute value of the locked target virtual object 602 in a manner of automatically tracking, and an allocation manner is as shown in FIG. 6. The 5 virtual flying objects 501 are all allocated to the locked target virtual object 602.

Figure 7:
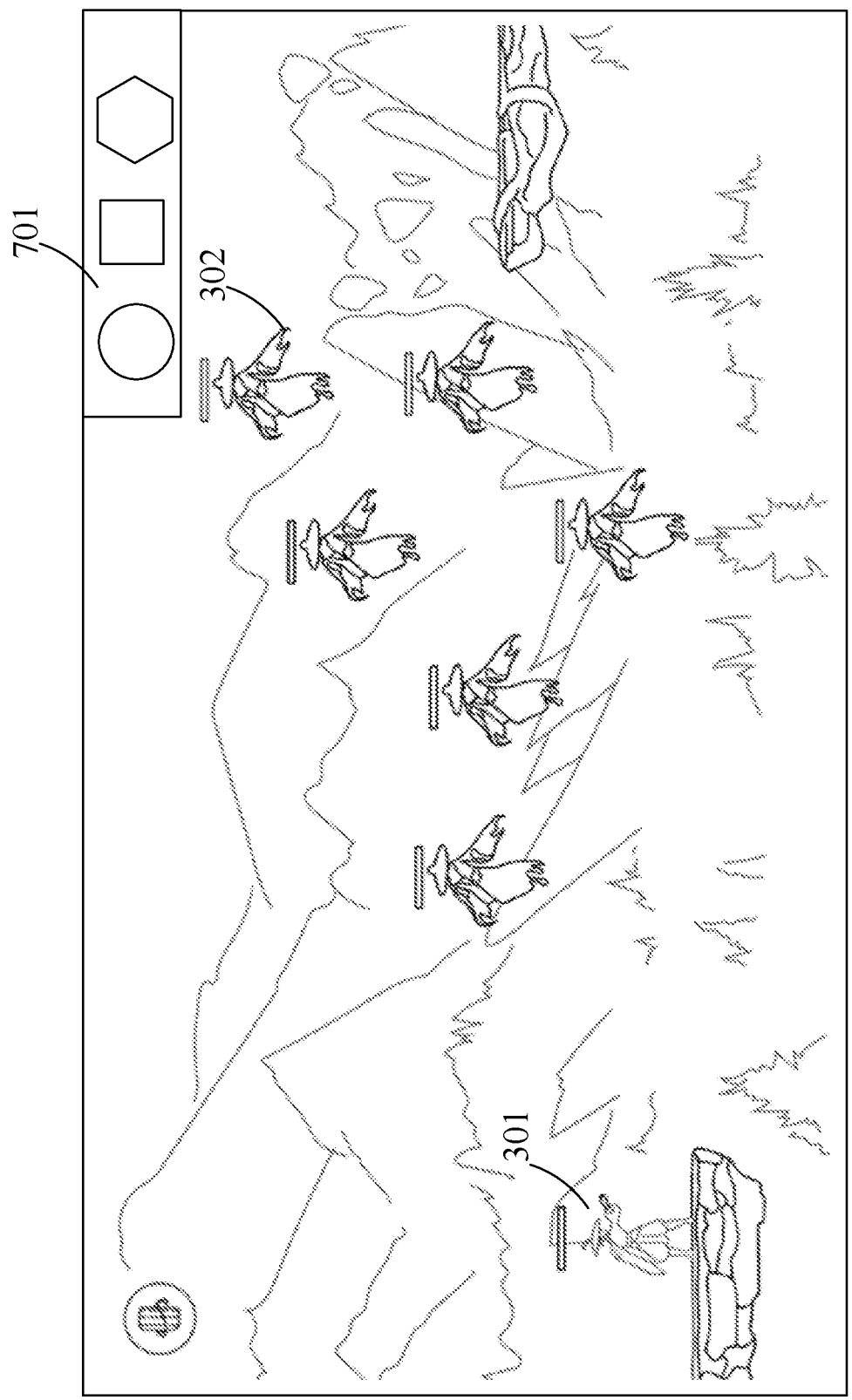
FIG. 7 is a schematic diagram of a side-scrolling virtual environment picture according to another exemplary embodiment.

In an embodiment, the virtual environment picture further includes at least two candidate lock indicators of the first ability, the candidate lock indicators have different shapes, and the lock indicator of the first ability is determined in response to a select operation on a target lock indicator in the candidate lock indicators. A shape of the candidate lock indicator may be at least one of a shape of a circle, a rectangle, a regular hexagon, a regular pentagon, or an ellipse. The shape of the candidate lock indicator is not limited in this application. Exemplarily, as shown in FIG. 7, the candidate lock indicators 701 of the first ability are displayed on the top right side of the virtual environment picture, and the shapes of the candidate lock indicators 701 include the shapes of a circle, a rectangle, and a regular hexagon. When the circle included is clicked, the cast region of the first ability is a circle. When the rectangle included is clicked, the cast region of the first ability is a rectangle.

In some embodiments, a corner of the lock indicator may be set by the user.

Figure 8:
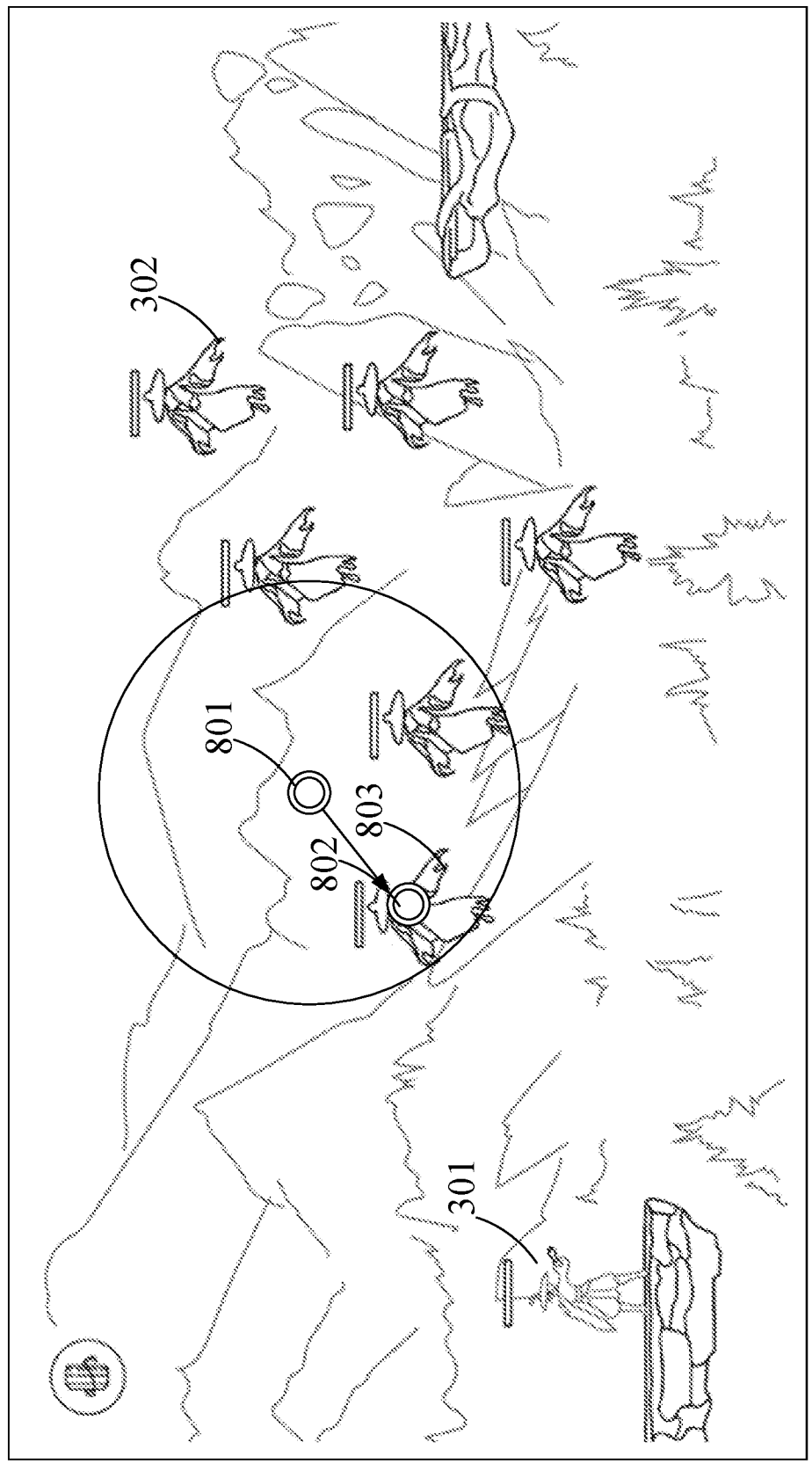
FIG. 8 is a schematic diagram of a side-scrolling virtual environment picture according to another exemplary embodiment.

In an embodiment, in response to detecting a touch start operation on the virtual environment picture, a first positioning point of the lock indicator of the first ability on the side-scrolling virtual environment picture is determined; and based on the first positioning point of the lock indicator, the lock indicator is displayed on the virtual environment picture. In response to detecting a slide operation on the virtual environment picture, a target second virtual object in the n second virtual objects is determined according to a slide destination of the slide operation. In response to detecting a touch terminate operation on the virtual environment picture, the m virtual flying objects released by the first virtual object are controlled to automatically track the n second virtual objects of the same type as the target second virtual object. Exemplarily, as shown in FIG. 8, the touch start operation on the virtual environment picture is detected, the first positioning point 801 of the lock indicator of the first ability on the side-scrolling virtual environment picture is determined, and the circular lock indicator is displayed by using the first positioning point 801 as a circle center. The slide operation on the virtual environment picture is detected, and the slide destination 802 of the slide operation is obtained. The slide destination 802 points to the target second virtual object 803. Therefore, the m virtual flying objects released by the first virtual object are controlled to automatically track the n second virtual objects of the same type as the target second virtual object 803.

In conclusion, through the second target lock operation and the second cast operation, the terminal implements the locking on the target virtual object and the allocation of the virtual flying objects. The user can quickly implement the locking on the target virtual object through directly touching the target virtual object, which improves locking efficiency of the user to the target virtual object and improves a human-computer interaction experience of the user.

Figure 9:
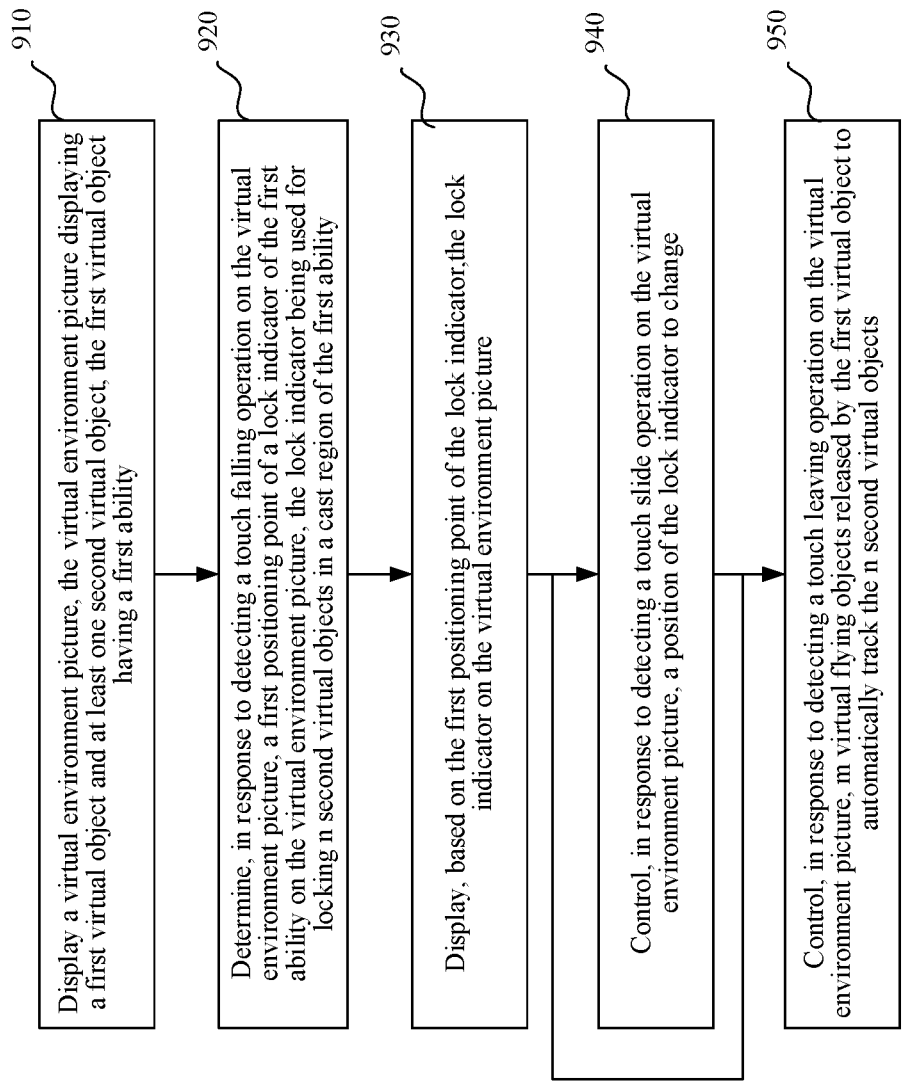
FIG. 9 is a flowchart of a method for a virtual object to cast an ability according to another exemplary embodiment.

To further implement performing target locking and ability casting on the n virtual objects in the ability casting region, FIG. 9 is a flowchart of a method for a virtual object to cast an ability according to an exemplary embodiment of this application, and this embodiment is described by using an example in which the method is performed by the first terminal 120 (or the client in the first terminal 120) shown in FIG. 1. The method includes the following steps:

Step 910: Display a virtual environment picture, the virtual environment picture displaying a first virtual object and at least one second virtual object, the first virtual object having a first ability.

The first ability refers to an ability cast by the first virtual object in the virtual environment. In an embodiment, the first ability of the first virtual object is displayed as reducing the attribute value of the second virtual object in a manner of automatically tracking by the m virtual flying objects simultaneously released by the first virtual object.

A side-scrolling virtual environment picture is a user picture displaying the virtual environment on a terminal. The virtual environment is displayed (or provided) when an application program runs on the terminal. The virtual environment may be a simulated environment of a real world, or may be a semi-simulated and semi-fictional environment, or may be a completely fictional environment.

Step 920: Determine, in response to detecting a touch start operation on the virtual environment picture, a first positioning point of a lock indicator of the first ability on the virtual environment picture, the lock indicator being used for locking n second virtual objects within a cast region of the first ability.

In an embodiment, a terminal performs potential detection on a screen, and in response to the terminal detecting a potential change caused by the touch start operation on the screen by a user, that is, the terminal detecting the touch start operation on the side-scrolling virtual environment picture, the terminal determines the first positioning point of the lock indicator of the first ability on the virtual environment picture. The first positioning point is used for positioning the lock indicator of the first ability.

In an embodiment, the first positioning point is located in the lock indicator, that is, the first positioning point is located inside or on the edge of a closed geometry of the lock indicator. Schematically, with reference to FIG. 4, the lock indicator is a closed circle and the first positioning point is a circle center of the circle.

In an embodiment, the first positioning point is located out of the lock indicator, that is, the first positioning point is located outside the closed geometry of the lock indicator. Based on a preset mapping relationship of a position of the first positioning point and a position of the lock indicator, the terminal may determine the position of the lock indicator through the position of the first positioning point.

Step 930: Display, based on the first positioning point of the lock indicator, the lock indicator on the virtual environment picture.

In some embodiments, the lock indicator is a circle and the lock indicator is displayed on the side-scrolling virtual environment picture by using the first positioning point as a circle center of the lock indicator; in an embodiment, the lock indicator is an ellipse, and the lock indicator is displayed on the side-scrolling virtual environment picture by using the first positioning point as a special position point of the lock indicator; in an embodiment, the lock indicator is a square, and the lock indicator is displayed on the side-scrolling virtual environment picture by using the first positioning point as a center of the lock indicator; in an embodiment, the lock indicator is a sector, and the first positioning point is used as a special position point of the lock indicator; or in an embodiment, the lock indicator is a rectangle, and the first positioning point is used as a vertex of the lock indicator. A relationship of the first positioning point and the lock indicator is not limited in this application, as long as there is a corresponding relationship between the first positioning point and the lock indicator.

Schematically, with reference to FIG. 4, the lock indicator is a closed circle, the first positioning point is a circle center of the circle, and the lock indicator 401 locks 3 second virtual objects 302.

In an embodiment, the lock indicator is a circle, and in response to using the first positioning point as a circle center of the lock indicator and using a preset radius as a radius of the lock indicator, the lock indicator is displayed on the side-scrolling virtual environment picture.

In some embodiments, the preset radius is a radius of the lock indicator preset by an application program, that is, the user cannot change the radius of the lock indicator; or in an embodiment, the preset radius is a radius of the lock indicator preset by the user on a client, that is, the user can change the radius of the lock indicator.

Step 940: Control, in response to detecting a touch slide operation on the virtual environment picture, the position of the lock indicator to change.

In an exemplary embodiment, after the terminal displays the lock indicator, the terminal detects the touch slide operation on the side-scrolling virtual environment picture and the terminal controls the position of the lock indicator to change. For example, in response to the terminal detecting a left slide operation on the side-scrolling virtual environment picture, the terminal controls the lock indicator to move to the left with the left slide operation.

The terminal may perform step 950 after performing step 940, or may directly perform step 950 without performing step 940, which is not limited in this application.

Step 950: Control, in response to detecting a touch terminate operation on the virtual environment picture, the m virtual flying objects released by the first virtual object to automatically track the n second virtual objects.

m and n are both integers not less than 2.

When the m virtual flying objects adjust the attribute values of then second virtual objects, exemplarily, in response to detecting the touch terminate operation on the side-scrolling virtual environment picture, the m virtual flying objects simultaneously released by the first virtual object are controlled to reduce the attribute values of the n second virtual objects in a manner of automatically tracking.

In an embodiment, in response to detecting the touch terminate operation on the side-scrolling virtual environment picture, the m virtual flying objects simultaneously released by the first virtual object are controlled by the terminal to reduce the attribute values of the n second virtual objects in the manner of automatically tracking.

In an embodiment, in response to a change of touch control pressure on the first positioning point, the radius of the lock indicator is changed.

Specifically, the terminal detects the touch control pressure on the first positioning point by the user, and changes the radius of the lock indicator based on the change of the pressure. Exemplarily, the terminal detects an increase of the touch control pressure on the first positioning point by the user, and increases the radius of the lock indicator until the radius of the lock indicator reaches a maximum value of the preset radius. Exemplarily, the terminal detects a decrease of the touch control pressure on the first positioning point by the user, and decreases the radius of the lock indicator until the radius of the lock indicator reaches a minimum value of the preset radius.

In conclusion, the lock indicator of the first ability is set on the virtual environment picture to lock the second virtual object located in a range of the lock indicator, and then the m virtual flying objects released by the first virtual object are controlled to automatically track the n second virtual objects in the range of the lock indicator. The lock indicator is shown as a closed geometry set based on the first positioning point of the side-scrolling virtual environment picture.

In the foregoing method, the terminal determines the position of the lock indicator through the first positioning point, and further generates the range of the lock indicator, which simplifies a generation method of the lock indicator, and the thereby obtained range of the lock indicator includes the second virtual object that the user wants to attack.

The foregoing method improves an aiming speed of simultaneously attacking a plurality of virtual objects by a plurality of virtual props, which greatly reduces operation difficulty for a player and improves the human-computer interaction efficiency of the user.

Figure 10:
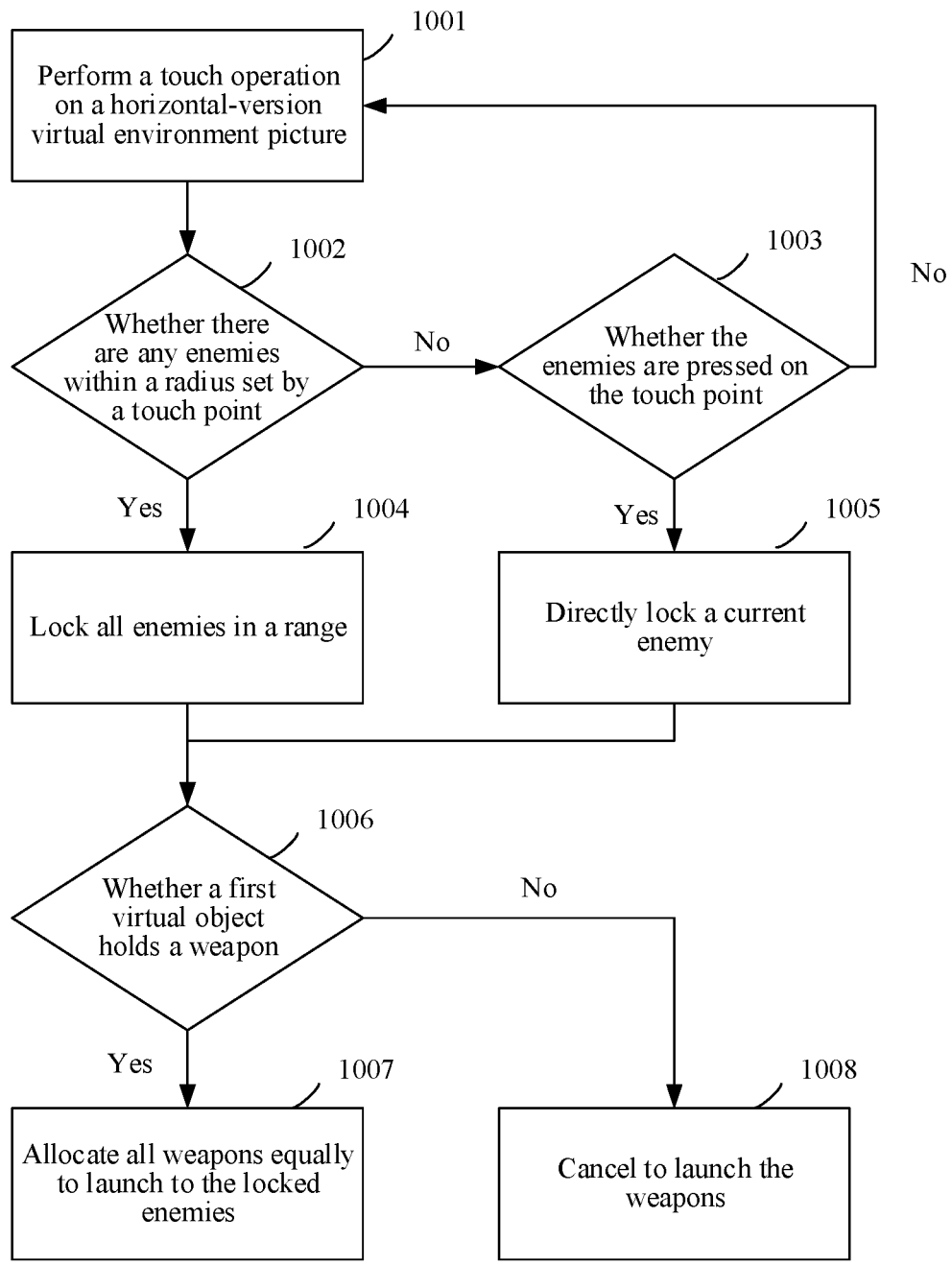
FIG. 10 is a flowchart of a method for a virtual object to cast an ability according to another exemplary embodiment.

FIG. 10 is a flowchart of a method for a virtual object to cast an ability according to an exemplary embodiment of this application, and this embodiment is described by using an example in which the method is performed by the first terminal 120 (or the client in the first terminal 120) shown in FIG. 1. The method includes the following steps:

Step 1001: Perform a touch operation on the side-scrolling virtual environment picture.

In response to the user performing the touch operation on the side-scrolling virtual environment picture, the terminal generates a touch point on the side-scrolling virtual environment picture.

Step 1002: Whether there are any enemies within a radius set based on the touch point.

The terminal determines whether there are any enemies with the radius set based on the touch point, and step 1004 is performed if there are enemies within the radius; or step 1003 is performed if there are no enemies within the radius.

Step 1003: Whether the enemies are pressed on the touch point.

The terminal determines whether the enemies are pressed by the user on the touch point, and step 1005 is performed if the enemies are pressed by the user on the touch point, or step 1001 is performed if the enemies are not pressed by the user on the touch point.

Step 1004: Lock all enemies in a range.

Based on the touch point and the set radius, the terminal generates a lock range and the terminal locks all enemies in the lock range.

Step 1005: Directly lock a current enemy.

Based on the terminal determining that the enemies are pressed on the touch point by the user, the terminal directly lock the current enemy.

Step 1006: Whether the first virtual object holds a weapon.

The terminal determines whether the first virtual object on the side-scrolling virtual environment picture holds a weapon, and step 1007 is performed if the first virtual object holds a weapon, and step 1008 is performed if the first virtual object does not hold a weapon.

Step 1007: Allocate all weapons equally to launch to the locked enemies.

In response to the first virtual object holding the weapons, the terminal equally allocates all weapons held by the first virtual object to launch to the locked enemies.

An algorithm of an equal allocation is: traversing enemies, and allocating the weapons to the traversed enemies in sequence, and the traversing is restarted from the beginning if the last part is traversed until the weapons are all allocated. In this way, a result is that some enemies are not targeted and shoot by the weapons if the quantity of the weapons is less than the quantity of the enemies, or there are a plurality of enemies allocated with a plurality of weapons if the quantity of the weapons is greater than the quantity of the enemies.

Step 1008: Cancel to launch the weapons.

In response to the first virtual object holding no weapons, the terminal cancels to launch the weapons.

Figure 11:
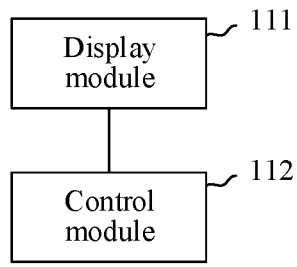
FIG. 11 is a structural block diagram of an ability casting apparatus for a virtual object according to an exemplary embodiment of this application.

FIG. 11 is a structural block diagram of an ability casting apparatus for a virtual object according to an exemplary embodiment of this application. The apparatus includes:

a display module 111, configured to display a virtual environment picture, the virtual environment picture displaying a first virtual object and at least one second virtual object, the first virtual object having a first ability;

the display module 111 being further configured to display, in response to a first target lock operation of the first ability, a lock indicator of the first ability on the virtual environment picture, the lock indicator being used for locking n second virtual objects within a cast region of the first ability; and a control module 112, configured to control, in response to a first cast operation of the first ability, m virtual flying objects released by the first virtual object to automatically track the n second virtual objects, m and n both being integers not less than 2.

In an exemplary embodiment, the control module 112 is further configured to control, when m is not less than n, the m virtual flying objects simultaneously released by the first virtual object to automatically track one second virtual object in the n second virtual objects respectively, where each second virtual object in the n second virtual objects at least corresponds to one virtual flying object in the m virtual flying objects.

In an exemplary embodiment, the control module 112 is further configured to control, when m is not less than n, i is not greater than n, and i is greater than 0, an $i^{th}$ virtual flying object in the m virtual flying objects to automatically track an $i^{th}$ virtual object in the n second virtual objects.

In an exemplary embodiment, the control module 112 is further configured to control, when m is not less than n, i is greater than n, and i is not greater than m, an $(i+1)^{th}$ virtual flying object in the m virtual flying objects to automatically track an $(i-n)^{th}$ virtual object in the n second virtual objects.

In an exemplary embodiment, the control module 112 is further configured to control, when m is less than n, the m virtual flying objects released by the first virtual object to automatically track m second virtual objects in the n second virtual objects, where the m second virtual objects are in a one-to-one correspondence to the m virtual flying objects.

In an exemplary embodiment, the display module 111 is further configured to lock, in response to a second target lock operation of the first ability, a target virtual object in the at least one second virtual object on the virtual environment picture.

In an exemplary embodiment, the control module 112 is further configured to control, in response to a second cast operation of the first ability, the m virtual flying objects simultaneously released by the first virtual object to automatically track the target virtual object.

In an exemplary embodiment, the display module 111 is further configured to determine, in response to detecting a touch start operation on the virtual environment picture, a second positioning point of the first ability, where the second positioning point is used for locking the target virtual object in the at least one second virtual object on the side-scrolling virtual environment picture.

In an exemplary embodiment, the control module 112 is further configured to control, in response to detecting a touch terminate operation on the virtual environment picture, the m virtual flying objects simultaneously released by the first virtual object to automatically track the target virtual object.

In an exemplary embodiment, the display module 111 is further configured to determine, in response to detecting the touch start operation on the virtual environment picture, a first positioning point of the lock indicator of the first ability on the virtual environment picture.

In an exemplary embodiment, the display module 111 is further configured to display, based on the first positioning point of the lock indicator, the lock indicator on the virtual environment picture.

In an exemplary embodiment, the control module 112 is further configured to control, in response to detecting the touch terminate operation on the virtual environment picture, the m virtual flying objects simultaneously released by the first virtual object to automatically track the n second virtual objects.

In an exemplary embodiment, the lock indicator is circular.

In an exemplary embodiment, the display module 111 is further configured to use the first positioning point as a circle center of the lock indicator, and display the lock indicator on the virtual environment picture.

In an exemplary embodiment, the display module 111 is further configured to use the first positioning point as the circle center of the lock indicator, use a preset radius as a radius of the lock indicator, and display the lock indicator on the virtual environment picture.

In an exemplary embodiment, the display module 111 is further configured to change, in response to a change of touch control pressure on the first positioning point, the radius of the lock indicator.

In an exemplary embodiment, the control module 112 is further configured to control, in response to the first cast operation of the first ability, the m virtual flying objects simultaneously released by the first virtual object to reduce attribute values of the n second virtual objects in a manner of automatically tracking.

In an exemplary embodiment, the display module 111 is further configured to display at least two candidate lock indicators of the first ability, and the candidate lock indicators have different shapes; and the control module 112 is further configured to determine, in response to a select operation on a target lock indicator in the candidate lock indicators, the lock indicator of the first ability.

In an exemplary embodiment, the control module 112 is further configured to determine, in response to detecting the touch start operation on the virtual environment picture, a second positioning point of the first ability, where the second positioning point is used for locking the target virtual object in the at least one second virtual object on the side-scrolling virtual environment picture; the display module 111 is further configured to display, based on the first positioning point of the lock indicator, the lock indicator on the virtual environment picture; and the control module 112 is further configured to control, in response to detecting the touch terminate operation on the virtual environment picture, the m virtual flying objects released by the first virtual object to automatically track the n second virtual objects.

In conclusion, the lock indicator of the first ability is set on the side-scrolling virtual environment picture to lock the second virtual object located within a range of the lock indicator, and then the m virtual flying objects simultaneously released by the first virtual object are controlled to reduce the attribute values of the n second virtual objects in the range of the lock indicator in the manner of automatically tracking. The foregoing apparatus improves an aiming speed of simultaneously attacking a plurality of virtual objects by a plurality of virtual props, which greatly reduces operation difficulty for a player and improves the human-computer interaction efficiency of the user.

Figure 12:
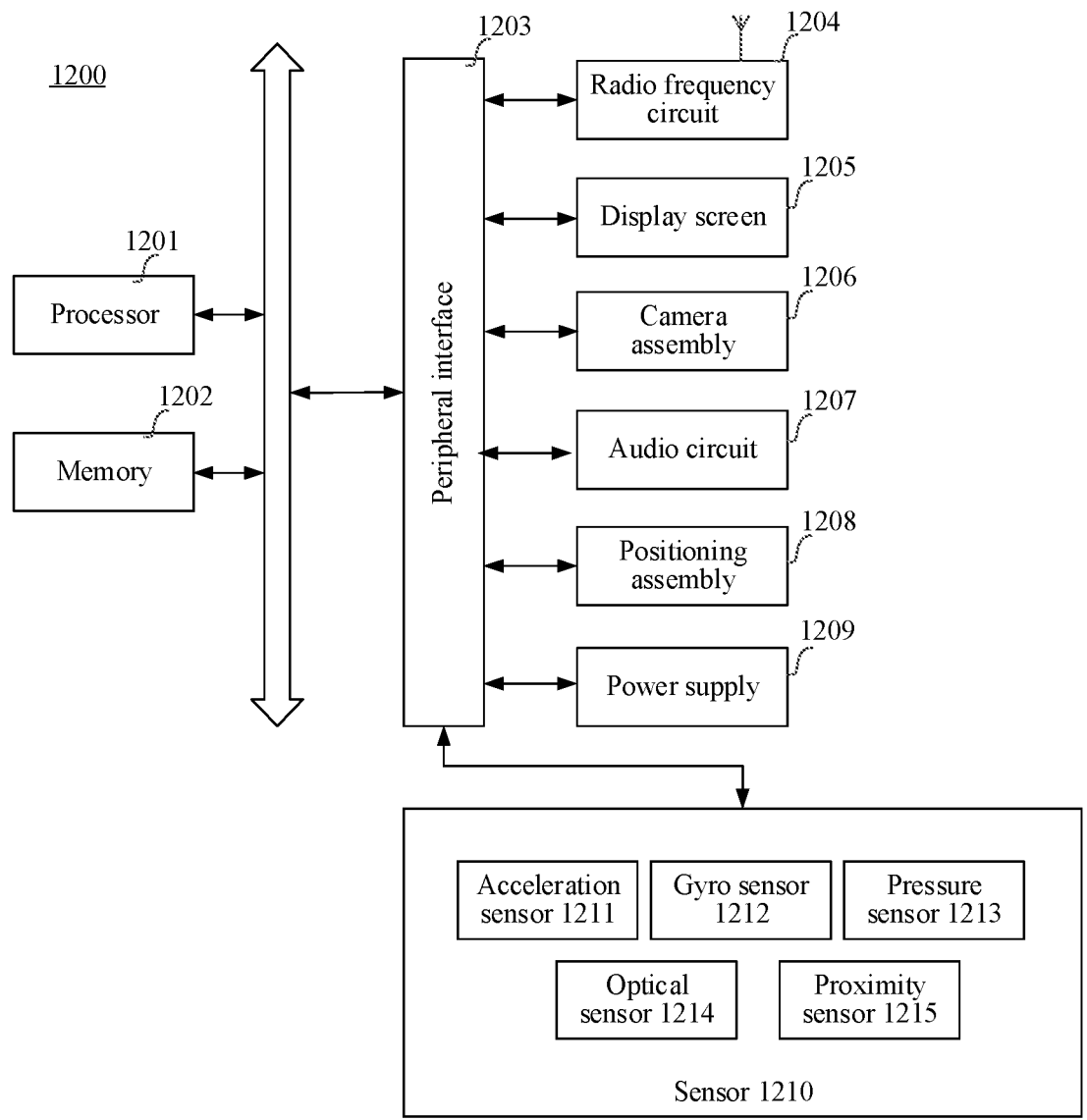
FIG. 12 is a structural block diagram of a computer device according to an exemplary embodiment of this application.

FIG. 12 is a structural block diagram of a computer device 1200 according to an exemplary embodiment of this application. The computer device 1200 may be a portable mobile terminal, such as: a smartphone, a tablet computer, a moving picture experts group audio layer III (MP3) player, a moving picture experts group audio layer IV (MP4) player, a notebook computer, or a desktop computer. The computer device 1200 may be further referred to as another name such as user equipment, a portable terminal, a laptop terminal, or a desktop terminal.

Generally, the computer device 1200 includes: a processor 1201 and a memory 1202.

The processor 1201 may include one or more processing cores, and may be, for example, a 4-core processor or an 8-core processor. The processor 1201 may be implemented in at least one hardware form of digital signal processing (DSP), field-programmable gate array (FPGA), and programmable logic array (PLA). The processor 1201 may alternatively include a main processor and a coprocessor. The main processor is configured to process data in an active state, also referred to as a central processing unit (CPU); and the coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial Intelligence (AI) processor. The AI processor is configured to process a computing operation related to machine learning.

The memory 1202 may include one or more computer-readable storage media that may be non-transitory. The memory 1202 may further include a high-speed random access memory and a non-volatile memory, for example, one or more disk storage devices or flash storage devices. In some embodiments, the non-transitory computer-readable storage medium in the memory 1202 is configured to store at least one instruction, and the at least one instruction is configured to be executed by the processor 1201 to implement the ability casting method for a virtual object according to the method embodiments in this application.

In some embodiments, the computer device 1200 may optionally include: a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. Exemplarily, the peripheral may include: at least one of a radio frequency circuit 1204, a display screen 1205, a camera assembly 1206, an audio circuit 1207, a positioning assembly 1208, and a power supply 1209.

In some embodiments, the computer device 1200 further includes one or more sensors 1210. The one or more sensors 1210 include but are not limited to: an acceleration sensor 1211, a gyro sensor 1212, a pressure sensor 1213, an optical sensor 1214, and a proximity sensor 1215.

A person skilled in the art may understand that the structure shown in FIG. 12 does not constitute any limitation on the computer device 1200, and the computer device may include more components or fewer components than those shown in the figure, or some components may be combined, or a different component deployment may be used.

This application further provides a computer-readable storage medium, the storage medium storing at least one instruction, at least one program, a code set or an instruction set, and the at least one instruction, the at least one program, the code set or the instruction set being loaded and executed by a processor to implement the ability casting method for a virtual object according to the foregoing method embodiments.

This application provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the ability casting method for a virtual object according to the foregoing method embodiments. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for selecting a target performed by a computer device and the method comprising:
   displaying at least one second virtual object in a virtual environment picture;
   in response to a first selection operation at a first location in the virtual environment picture, displaying a selection indicator in the virtual environment picture, the selection indicator surrounding the first location of the first selection operation in the virtual environment picture, and the selection indicator defining an initial selection region that identifies one or more initial second virtual objects in the selection region, and has a dimension centering around the first location of the first selection operation;
   while the first selection operation is being performed, updating the selection region and changing the one or more initial second virtual objects in the updated selection region accordingly when the first selection operation moves within the virtual environment picture, wherein the updated selection region has a same dimension as the dimension of the initial selection region;
   in response to a first confirmation operation at a second location in the virtual environment picture, determining one or more final second virtual objects as a target, wherein there is at least one difference between the one or more initial second virtual objects and the one or more final second virtual objects, including:
   in response to a determination that one of the one or more final second virtual objects is located at the second location in the virtual environment picture, determining the one of the one or more final second virtual objects as the targeted final second virtual object; and in response to a determination that none of the one or more final second virtual objects is located at the second location in the virtual environment picture, determining each of the one or more final second virtual objects as the targeted final second virtual objects; and releasing m virtual objects to interact with the one or more targeted final second virtual objects.

2. The method according to claim 1, wherein the first confirmation operation is a release operation of the first selection operation.

3. The method according to claim 1, further comprising:
controlling a first virtual object to simultaneously release the m virtual objects to interact with the one or more final second virtual objects, a number of the one or more final second virtual objects being n, and m and n both being integers not less than 2.

4. The method according to claim 3, wherein the m virtual objects are an effect of an ability of the first virtual object.

5. The method according to claim 3, wherein the controlling a first virtual object to simultaneously release the m virtual objects to interact with the one or more final second virtual objects comprises:
when m is not less than n, controlling the m virtual objects released by the first virtual object to automatically interact with each one second virtual object in the one or more final second virtual objects respectively, wherein
each second virtual object in the one or more final second virtual objects at least corresponds to one virtual object in the m virtual objects.

6. The method according to claim 3, wherein controlling a first virtual object to simultaneously release the m virtual objects to interact with the one or more final second virtual objects comprises:
when m is less than n, controlling the m virtual objects released by the first virtual object to automatically interact with m second virtual objects in the one or more final second virtual objects, wherein
the m second virtual objects are in a one-to-one correspondence to the m virtual objects.

7. The method according to claim 3, further comprising:
controlling the m virtual objects to track the one or more final second virtual objects.

8. The method according to claim 3, further comprising:
controlling the m virtual objects released by the first virtual object to reduce attribute values of the one or more final second virtual objects.

9. The method according to claim 1, further comprising:
in response to a second target selection operation, selecting a single second virtual object from the at least one second virtual object in the virtual environment picture; and
in response to a second confirmation operation, determining the single second virtual object as the target.

10. The method according to claim 9, further comprising:
detecting a target selection operation at a third location of the virtual environment picture;
determining the target selection operation as being the second target selection operation when the target selection operation overlaps with the single second virtual object at the third location; and
determining the target selection operation as being the first selection operation when the target selection operation does not overlap with a second virtual object at the third location.

11. A computer device, comprising: a processor and a memory, the memory storing a computer program, and the computer program being loaded and executed by the processor and causing the computer device to implement a method for selecting a target, the method including:
displaying at least one second virtual object in a virtual environment picture;
in response to a first selection operation at a first location in the virtual environment picture, displaying a selection indicator in the virtual environment picture, the selection indicator surrounding the first location of the first selection operation in the virtual environment picture, and the selection indicator defining an initial selection region that identifies one or more initial second virtual objects in the selection region, and has a dimension centering around the first location of the first selection operation;
while the first selection operation is being performed, updating the selection region and changing the one or more initial second virtual objects in the updated selection region accordingly when the first selection operation moves within the virtual environment picture, wherein the updated selection region has a same dimension as the dimension of the initial selection region;
in response to a first confirmation operation at a second location in the virtual environment picture, determining one or more final second virtual objects as a target, wherein there is at least one difference between the one or more initial second virtual objects and the one or more final second virtual objects, including:
in response to a determination that one of the one or more final second virtual objects is located at the second location in the virtual environment picture, determining the one of the one or more final second virtual objects as the targeted final second virtual object; and
in response to a determination that none of the one or more final second virtual objects is located at the second location in the virtual environment picture, determining each of the one or more final second virtual objects as the targeted final second virtual objects; and
releasing m virtual objects to interact with the one or more targeted final second virtual objects.

12. The computer device according to claim 11, wherein the first confirmation operation is a release operation of the first selection operation.

13. The computer device according to claim 11, wherein the method further comprises:
controlling a first virtual object to simultaneously release the m virtual objects to interact with the one or more final second virtual objects, a number of the one or more final second virtual objects being n, and m and n both being integers not less than 2.

14. The computer device according to claim 13, wherein the m virtual objects are an effect of an ability of the first virtual object.

15. The computer device according to claim 11, wherein the method further comprises:
in response to a second target selection operation, selecting a single second virtual object from the at least one second virtual object in the virtual environment picture; and
in response to a second confirmation operation, determining the single second virtual object as the target.

16. A non-transitory computer-readable storage medium, storing a computer program, the computer program being loaded and executed by a processor of a computer device and causing the computer device to implement a method for selecting a target, the method including:
- displaying at least one second virtual object in a virtual environment picture;
- in response to a first selection operation at a first location in the virtual environment picture, displaying a selection indicator in the virtual environment picture, the selection indicator surrounding the first location of the first selection operation in the virtual environment picture, and the selection indicator defining an initial selection region that identifies one or more initial second virtual objects in the selection region, and has a dimension centering around the first location of the first selection operation;
- while the first selection operation is being performed, updating the selection region and changing the one or more initial second virtual objects in the updated selection region accordingly when the first selection operation moves within the virtual environment picture, wherein the updated selection region has a same dimension as the dimension of the initial selection region;
- in response to a first confirmation operation at a second location in the virtual environment picture, determining one or more final second virtual objects as a target, wherein there is at least one difference between the one or more initial second virtual objects and the one or more final second virtual objects, including:
  - in response to a determination that one of the one or more final second virtual objects is located at the second location in the virtual environment picture, determining the one of the one or more final second virtual objects as the targeted final second virtual object; and
  - in response to a determination that none of the one or more final second virtual objects is located at the second location in the virtual environment picture, determining each of the one or more final second virtual objects as the targeted final second virtual objects; and
- releasing m virtual objects to interact with the one or more targeted final second virtual objects.

\* \* \* \* \*